US009537678B2

(12) United States Patent
Lee et al.

(10) Patent No.: US 9,537,678 B2
(45) Date of Patent: Jan. 3, 2017

(54) METHOD AND APPARATUS FOR ROBUST TWO-STAGE OFDM CHANNEL ESTIMATION

(71) Applicant: Samsung Electronics Co., Ltd., Gyeonggi-do (KR)

(72) Inventors: Jungwon Lee, San Diego, CA (US); Yingqun Yu, San Diego, CA (US); Sungsoo Kim, Seoul (KR); CheolHee Park, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 80 days.

(21) Appl. No.: 14/519,660

(22) Filed: Oct. 21, 2014

(65) Prior Publication Data

US 2015/0229493 A1    Aug. 13, 2015

Related U.S. Application Data

(60) Provisional application No. 61/939,649, filed on Feb. 13, 2014.

(51) Int. Cl.
*H04L 12/26* (2006.01)
*H04L 25/02* (2006.01)
*H04L 5/00* (2006.01)

(52) U.S. Cl.
CPC ......... *H04L 25/022* (2013.01); *H04L 25/0234* (2013.01); *H04L 25/0242* (2013.01);
(Continued)

(58) Field of Classification Search
CPC .. H04L 25/022; H04L 25/0232; H04L 5/0007; H04L 25/0242; H04L 25/0256; H04L 25/0222; H04L 25/024; H04L 27/2634; H04B 17/364; H04B 7/0413; H04B 7/0619; H04B 7/0626; H04B 7/0697; H04W 72/0446
(Continued)

(56) References Cited

U.S. PATENT DOCUMENTS 5,914,933 A * 6/1999 Cimini ................. H04B 7/0613
                                                370/208
6,760,300 B1    7/2004 Eberle et al.
(Continued)

OTHER PUBLICATIONS

ETSI TS 136 211 V10.7.0 (Apr. 2013) LTE; Evolved Universal Terrestrial Radio Access (E-UTRA); Physical channels and modulation (3GPP TS 36.211 version 10.7.0 Release 10) pp. 103.
(Continued)

*Primary Examiner* — Dang Ton
*Assistant Examiner* — Lionel Preval
(74) *Attorney, Agent, or Firm* — The Farrell Law Firm, P.C.

(57) ABSTRACT

Methods, apparatuses, and systems for improved channel estimation in an Orthogonal Frequency Division Multiplexing (OFDM) system are discussed. In one example discussed herein, joint two-dimensional Minimum Mean-Square Error (2D-MMSE) channel estimation is performed on any Resource Element (REs) containing a reference signal in a Resource Block (RB), one-dimensional Minimum Mean-Square Error (1D-MMSE) channel estimation is performed in the frequency domain on each OFDM symbol in the RB, and then channel estimation is performed in the time domain on each frequency sub-carrier in the RB. In another example discussed herein, Power Delay Profiles (PDPs) and/or frequency correlations are calculated using minimax optimization and then stored in a Look-Up Table (LUT) indexed by estimated Signal to Noise Ratio (SNR) and the estimated maximum delay spread. A portable device could use such an LUT in MMSE calculations.

20 Claims, 8 Drawing Sheets

(52) U.S. Cl.
CPC ........ *H04L 25/0256* (2013.01); *H04L 5/0023* (2013.01); *H04L 5/0051* (2013.01)

(58) Field of Classification Search
USPC ......... 370/252, 340, 232, 329, 208; 375/267
See application file for complete search history.

(56) References Cited

U.S. PATENT DOCUMENTS

| | | |
|---|---|---|
| 7,292,651 B2 | 11/2007 | Li |
| 7,489,731 B2 | 2/2009 | Coulson et al. |
| 7,876,839 B2 | 1/2011 | Dong et al. |
| 7,990,839 B2 | 8/2011 | Cimini, Jr. et al. |
| 7,995,688 B2 | 8/2011 | Hong et al. |
| 8,275,055 B2 | 9/2012 | Zhang et al. |
| 8,331,467 B2 | 12/2012 | Osseiran et al. |
| 8,451,959 B2 | 5/2013 | Hui |
| 8,462,655 B2 | 6/2013 | Chun et al. |
| 8,634,487 B2 | 1/2014 | Kent et al. |
| 8,644,330 B2 | 2/2014 | Lomnitz et al. |
| 2007/0147533 A1 | 6/2007 | Thomas et al. |
| 2012/0147761 A1* | 6/2012 | Zhang ................ H04L 25/0234 370/252 |
| 2012/0314755 A1* | 12/2012 | Pietraski ........... H04L 25/03038 375/232 |
| 2013/0051489 A1 | 2/2013 | Singh et al. |
| 2013/0188757 A1* | 7/2013 | Kalyani ................ H04L 5/0048 375/340 |
| 2013/0215826 A1 | 8/2013 | Kalyani et al. |
| 2013/0308555 A1* | 11/2013 | Ho ........................ H04L 5/0048 370/329 |
| 2015/0049830 A1* | 2/2015 | Hu ........................ H04L 5/0023 375/267 |

OTHER PUBLICATIONS

ETSI TS 136 211 V11.5.0 (Jan. 2014) LTE; Evolved Universal Terrestrial Radio Access (E-UTRA); Physical channels and modulation (3GPP TS 36.211 version 11.5.0 Release 11) pp. 122.
Shen, Yushi et al., Channel Estimation in OFDM Systems, Copyright Freescale Semiconductor, Inc., 2006, pp. 16.
Li, Ye (Geoffrey) et al., Channel Estimation for OFDM Systems . . . , IEEE Journal on Selected Areas in Communications, vol. 17, No. 3, Mar. 1999, Copyright 1999 IEEE, pp. 11.
Li, Ye (Geoffrey) et al., Pilot-Symbol-Aided Channel Estimation for OFDM . . . , IEEE Transactions on Vehicular Technology, vol. 49, No. 4, Jul. 2000, Copyright 2000 IEEE, pp. 9.
Cai, Jun et al., Robust Channel Estimation for OFDM Wireless . . . , IEEE Transactions on Wireless Communications, vol. 3, No. 6, Nov. 2004, Copyright 2004 IEEE, pp. 12.
Srivastava, Vineet et al., Robust MMSE Channel Estimation in OFDM Systems with Practical Timing Synchronization, IEEE Communications Society, Copyright 2004 IEEE, pp. 6.

\* cited by examiner

Reference Signals in LTE Downlink Subframe

DMRS alone, with both CDM1 and CDM2 groups

Raw Channel Estimates (CEs) for the
Six Pilot Locations RE($l_t,k_f$): pilot $t=0,2$ and pilot $f=0,1,2$
from CDM1 after Initial Despreading Full 2D-MMSE for final CE of RE($l_t,k_f$) at $t$=8 and $f$=8
using the Raw Channel Estimates (CEs)
at the Six Pilot Locations RE($l_t,k_f$): pilot $t$=0,2 and pilot $f$=0,1,2

Hybrid 2D/2x1D-MMSE for final CE of RE($l_t,k_f$) at $t=8$ and $f=8$ using the Raw Channel Estimates (CEs) at the Six Pilot Locations RE($l_t,k_f$): pilot $t=0,2$ and pilot $f=0,1,2$ LUT-implementation of Robust PDP for MMSE Weight Calculation Two-Stage Hybrid 2D/2x1D Channel Estimation with Robust PDP

METHOD AND APPARATUS FOR ROBUST TWO-STAGE OFDM CHANNEL ESTIMATION

PRIORITY

The present application claims priority under 35 U.S.C. §119(e) to U.S. Provisional Application No. 61/939,649, entitled "Method and Apparatus for Robust Two-Stage OFDM Channel Estimations," which was filed on Feb. 13, 2014, the contents of which are incorporated herein by reference.

BACKGROUND OF THE INVENTION

1. Field of the Invention

The present invention relates generally to channel estimation, and more particularly to more robust and better performing channel estimation in an Orthogonal Frequency Division Multiplexing (OFDM) system.

2. Description of the Related Art

Modern cellular systems such as the $4^{th}$ generation Long Term Evolution (LTE) and WiMax networks depend on coherent detection for data communications to achieve high performance, and coherent detection requires Channel State Information (CSI) to be implemented. For OFDM systems, pilot-aided channel estimation is an effective way to obtain CSI at the receiver side.

In one example of pilot-aided channel estimation (from LTE), predetermined Cell-specific Reference Signal (CRS) symbols known to the receiver are scattered in a regular pattern in the two-dimensional (2D) OFDM frequency-time plane and transmitted periodically on one or more antenna ports. At the receiver, typical channel estimation uses Least Square (LS) or Minimum Mean-Square Error (MMSE) calculations. In general, MMSE performs much better than LS and thus is often preferred in practice.

In the new LTE Release 10 specifications, a User Equipment (UE)-specific reference signal (RS) for demodulation is also introduced. See, e.g., 3GPP TS 36.211, "Evolved Universal Terrestrial Radio Access (E-UTRA): Physical Channels and Modulation (Release 10)," and 3GPP TS 36.213, "Evolved Universal Terrestrial Radio Access (E-UTRA): Physical layer procedures (Release 10)," both of which are incorporated in their entirety by reference. Such a dedicated RS (i.e., which is dedicated to a single UE) is referred to as a Demodulation Reference Signal (DMRS), and, because the same precoding (which can be non-codebook-based) can be applied to both the RS and data resource elements (REs), precoder-transparent demodulation is enabled—a feature unavailable with plain CRS. MMSE channel estimation calculations can also be used for DMRS. There are two key differences between DMRS and CRS: (1) DMRS is narrow-band, while CRS is wide-band; and (2) DMRS enables precoder-transparent demodulation by applying the same precoding (which can be non-codebook-based) on both RS and data resource elements (REs), while CRS does not.

Existing MMSE OFDM channel estimations typically fall into two types:

(1) the joint frequency-time 2D filter (hereinafter referred to as any of "2D", "2D-MMSE", "full 2D" or "f2D", and "f2D-MMSE"); and (2) the two 1D filters concatenated sequentially in the frequency and time direction (hereinafter referred to as "2×1D" and "2×1D-MMSE").

The 2D channel estimation has better performance at the cost of high computational complexity which also leads to large processing delay. The 2×1D method is a good tradeoff between complexity and performance and hence is often being implemented in practice. However, when there is a large delay spread and high Signal to Noise Ratio (SNR), there is a considerable performance gap between 2D and 2×1D. For more details on 2D and 2×1D, see any of the following references, each of which is incorporated herein in their entirety: U.S. Pat. Pub. No. 2012/0147761, entitled Channel Estimation for Long Term Evolution (LTE) Terminals; U.S. patent application Ser. No. 10/687,400, entitled Pilot-aided Channel Estimation for OFDM in Wireless Systems; and the Freescale Semiconductor Application Note entitled *Channel estimation in OFDM systems*, by Yushi Shen and Ed Martinez (2006).

Whether using 2D or 2×1D, MMSE estimators require current channel statistics, such as, e.g., channel power delay profile (PDP) and/or the Doppler spectrum. Such channel statistics can be estimated in some cases, such as when the CRS is continuously transmitted in the LTE system, but this necessarily causes extra complexity in the receiver. Usually the receiver does not directly estimate such channel statistics and instead relies on some reasonable assumptions.

It has been shown that when there is no true PDP knowledge at the receiver side, assuming a uniform PDP, i.e., that the channel power is evenly distributed in the maximum delay spread interval, is a robust choice in the sense that it can minimize the worse-case Mean-Square Error (MSE) asymptotically (namely, assuming an infinite number of pilots). The MSE degradation becomes highly insensitive to the mismatch between the real current PDP and the assumed uniform PDP model. Hence, the uniform PDP is the default choice from both approximate and heuristic aspects. For more details, see *Pilot-symbol-aided channel estimation for OFDM in wireless systems*, by Ye Li, et al., IEEE Trans. Veh. Technol., vol. 49, No. 4, July 2000, the entire contents of which are incorporated herein in its entirety.

However, it is very difficult, and in some cases impossible, to estimate the PDP using the UE-specific DMRS defined in the LTE standard, which has precoding which may change from subframe to subframe and PRB (Physical Resource Block) to PRB. The differences between the UE-specific reference signal DMRS and the cell-specific reference signal CRS cause some problems unique to DMRS:

Unlike wide-band CRS, denoising in the time domain is not a viable approach to reduce the noise level for DMRS channel estimation.

Unlike CRS, in which MMSE weights can be derived from estimated channel statistics (i.e., PDP), estimated channel statistics like PDP are not suitable for DMRS because DMRS precoding may change from PRB to PRB and/or from subframe to subframe.

The usually robust uniform distribution PDP model incurs mismatch loss when used for DMRS channel estimation especially at high SNR with large delay spreads.

In addition to the knowledge or assumption of PDP, the MMSE estimator also demands the information of equivalent SNR. For CRS, the SNR can be estimated with reasonable accuracy. However, for DMRS, there may be some power mismatch between CRS and DMRS due to precoding. Such a mismatch will result in unavoidable performance loss as well.

For CRS, different antenna ports are orthogonal in time and frequency and there are no interferences among them. For DMRS in a Multiple User Multiple Input Multiple Output (MU-MIMO) environment, two antenna ports or more may use non-orthogonal random sequences in generating DMRS sequences, resulting in cross interferences among them. Joint channel estimation or interference cancellation should be used if such interferences are strong.

Thus, there is a need for systems, devices, and methods for OFDM channel estimation with greater performance, reliability, and robustness.

SUMMARY OF THE INVENTION

Accordingly, the present invention has been made to address at least the problems and/or disadvantages described above and to provide at least the advantages described below. In one aspect of the invention, a Hybrid 2D and 1D MMSE channel estimation ("2D/2×1D" or "2D/2×1D-MMSE") method is provided, which has greater accuracy than 2×1D and much less complexity than 2D. In another aspect of the invention, a robust PDP model for MMSE weight calculations is provided using a minimax optimization method.

According to one aspect of the present invention, a method for a receiver to estimate one or more conditions of a channel upon which the receiver receives Orthogonal Frequency Division Multiplexing (OFDM) signals, includes performing joint two-dimensional Minimum Mean-Square Error (2D-MMSE) channel estimation on any Resource Element (REs) containing a reference signal in a received resource block (RB); using data at least from the joint 2D-MMSE channel estimation of the reference signal REs, performing one-dimensional Minimum Mean-Square Error (1D-MMSE) channel estimation in the frequency domain on each OFDM symbol in the received RB; and using data at least from the 1D-MMSE channel estimation in the frequency direction, performing channel estimation in the time domain on each frequency sub-carrier in the received RB.

According to another aspect of the present invention, a method for a receiver to perform Minimum Mean-Square Error (2D-MMSE) channel estimation of a channel upon which the receiver receives Orthogonal Frequency Division Multiplexing (OFDM) signals includes extracting pilot symbols from a descrambled and despread communication received over the channel; estimating a Signal-to-Noise Ratio (SNR) of the channel using the extracted pilot symbols from the descrambled and despread communication; estimating a maximum delay spread of the channel using the extracted pilot symbols from the descrambled and despread communication; using the estimated SNR and the estimated maximum delay spread as indices, finding at least one of a Power Delay Profile (PDP) or frequency correlations which correspond to the estimated SNR and maximum delay spread in a Look-Up Table (LUT); and calculating MMSE weights using the found at least one of a Power Delay Profile (PDP) or frequency correlations, wherein the at least one of a Power Delay Profile (PDP) or frequency correlations was calculated using minimax optimization and then stored in the LUT indexed by estimated SNR and the estimated maximum delay spread.

According to still another aspect of the present invention, a portable device is provided, including one or more antennas; a receiver; one or more processors; and at least one non-transitory computer-readable medium having instructions that, when executed by the one or more processors, enable the portable device to perform the steps of performing joint two-dimensional Minimum Mean-Square Error (2D-MMSE) channel estimation on any Resource Element (REs) containing a reference signal in a resource block (RB) received, via the one or more antennas, by the transceiver; using data at least from the joint 2D-MMSE channel estimation of the reference signal REs, performing one-dimensional Minimum Mean-Square Error (1D-MMSE) channel estimation in the frequency domain on each OFDM symbol in the received RB; and using data at least from the 1D-MMSE channel estimation in the frequency direction, performing channel estimation in the time domain on each frequency sub-carrier in the received RB.

BRIEF DESCRIPTION OF THE DRAWINGS

The above and other aspects, features, and advantages of embodiments of the present invention will be more apparent from the following detailed description taken in conjunction with the accompanying drawings, in which.

DETAILED DESCRIPTION OF EMBODIMENTS OF THE INVENTION

Figure 1A:
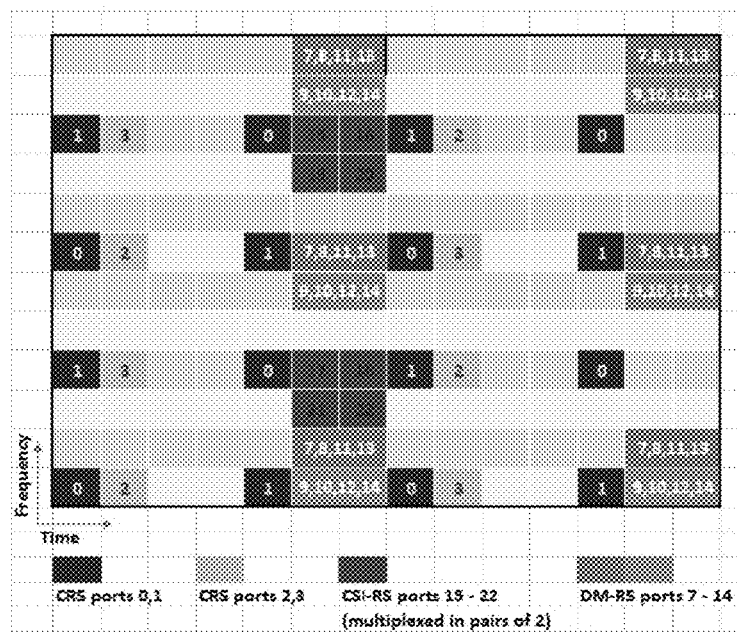
FIG. 1A illustrates a typical configuration of reference signals in the Resource Elements (REs) of an LTE downlink Resource Block (RB) with normal cyclic prefix (CP), to which embodiments of the present invention can be applied.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Various embodiments may comprise one or more elements. An element may comprise any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In embodiments of the present invention, OFDM channel estimation performance is improved by using at least one of:
 (1) Hybrid 2D and 1D MMSE channel estimation ("2D/ 2×1D" or "2D/2×1D-MMSE"); and/or
 (2) a minimax optimized robust PDP model for MMSE weight calculations.

In an embodiment of the 2D/2×1D hybrid according to the present invention, full 2D-MMSE estimation is only used on pilot signal locations while 2×1D-MMSE estimation is applied on data locations. 2D provides more accurate channel estimates on the pilot locations which, in turn, can provide better initial estimations for the 2×1D estimates in the data locations. Complexity is minimized by only requiring full 2D-MMSE estimation for the pilot locations or a subset of them. Simulations suggest that the inventive two-stage hybrid method can get close-to-2D performance with small complexity increase.

In an embodiment for providing a robust PDP model according to the present invention, minimax optimization is used to determine, for a given SNR and maximum delay spread, a robust PDP model which minimizes the worst case MSE. In one embodiment, these PDP model solutions are first calculated and then saved in memory for use in real-time operations.

LTE Downlink: CRS and DMRS

In the LTE downlink, both channel and covariance estimations are based on reference signals. The common, wide-band CRSs are transmitted in all downlink subframes, supporting both control channels, including the Physical Downlink Control CHannel (PDCCH), and the data channel Physical Downlink Shared CHannel (PDSCH) demodulations, as well as the receiver measurements. CRSs are transmitted on one or several antenna ports: $p \in \{0\}$; $p \in \{0,1\}$; and $p \in \{0, 1, 2, 3\}$.

Narrow-band UE-specific DMRSs are dedicated only to PDSCH demodulation. The DMRS is only transmitted on specific Physical Resource Blocks (PRBs) to which the PDSCH is mapped. In LTE Rel. 8, a single transmission port p=5 is defined. In LTE Rel. 9, Transmission Mode (TM) 8 supports either single-layer Multiple User-Multiple Input Multiple Output (MU-MIMO) or dual layer Single User-MIMO (SU-MIMO), both of which use DMRS antenna ports p={7,8} for channel estimation and demodulation. Since both the DMRS and the UE data are processed by the same precoder, the UE does not need the precoder information for demodulation. Therefore, closed-loop precoding feedback may (or may not) be used.

In addition, the evolved Node B (eNB) can use advanced non-codebook-based precoding matrices and thus has more freedom to optimize receiver performance. This mode supports up to 4 UEs and 2 codewords per UE. In LTE Rel. 10, TM 9, an extension of TM 8, can support up to an 8×8 MIMO configuration. Accordingly, up to 8 DMRS antenna ports are defined: $p \in \{7, 8, \ldots, v+6\}$, where v is the number of layers used for PDSCH transmission. Furthermore, TM 9 introduces new reference signals called Channel State Information Reference Signals (CSI-RS). The new CSI-RS is used for measurement purposes only and, accordingly, can send information such as Channel Quality Indicator (CQI)/ Pre-coding Matrix Indicator (PMI)/Rank Indicator (RI) back to the eNB. In TM 9, the DMRS is used for precoder-transparent demodulation.

FIG. 1A illustrates a typical configuration of reference signals in the Resource Elements (REs) of an LTE downlink resource block with normal cyclic prefix (CP). As shown in FIG. 1A, the LTE downlink resource block has 14 OFDM symbols in the time direction and 12 subcarriers in the frequency direction. The CRS, CSI-RS, and DMRS signals are indicated in the darkened or shaded REs with numerals on the inside, which are the port numbers corresponding to the reference signals, namely: CRS has ports 0-3, CSI-RS has ports 15-22, and DMRS has ports 7-14.

Figure 1B:
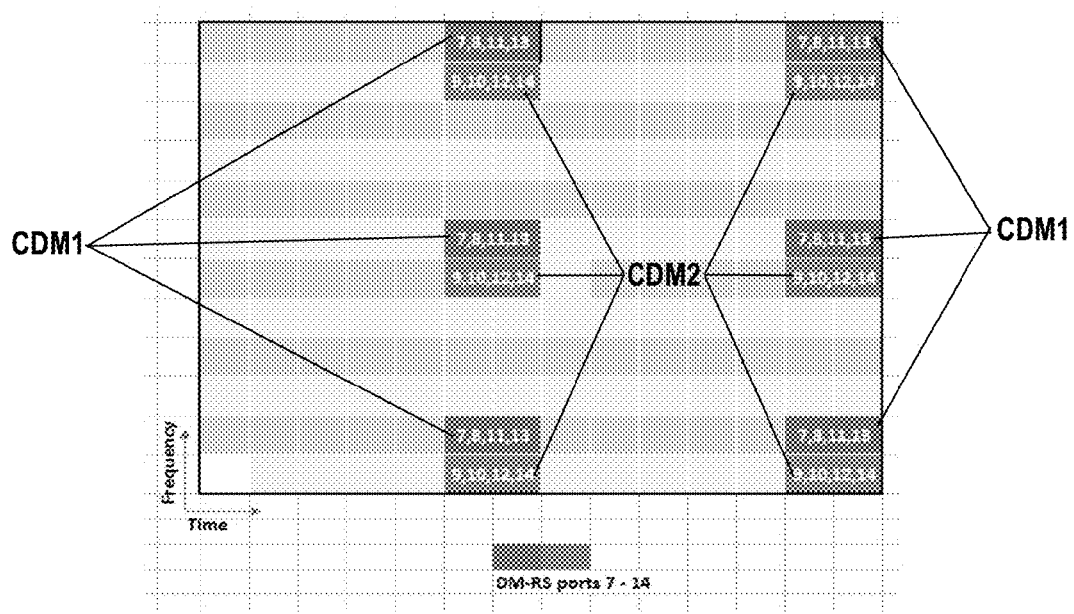
FIG. 1B illustrates only the DMRS signals from the typical configuration of FIG. 1A, and the two.

FIG. 1B shows only the DMRS signals in the typical configuration shown in FIG. 1A. FIG. 1B shows the typical DMRS pattern, which consists of two Code-Division Multiplexing (CDM) groups, CDM group 1 (CDM1) and CDM group 2 (CDM2). Each CDM group supports up to 4 DMRS layers (or DMRS antenna ports). CDM1 consists of DMRS antenna ports 7, 8, 11 and 13, while CDM2 consists of DMRS antenna ports 9, 10, 12 and 14. As shown in FIG. 1B, there are 12 DMRS REs per CDM group scattered in a regular pattern in the 2D time/frequency plane with 4 OFDM symbols ($l_j$, t=0, 1, 2, 3) in the time domain and 3 subcarriers ($k_j$, f=0, 1, 2) in the frequency domain. Thus, CDM1 has OFDM symbol $l_0$ at t=5, $l_1$ at t=6, $l_2$ at t=12, and $l_3$ at t=13, on subcarriers $k_0$ at f=1, $k_1$ at f=6, and $k_3$ at f=11.

For v layers of data transmission of a given UE, where $v \in \{1, 2, \ldots, 8\}$, the DMRS ports used are $\{7, 8, \ldots, v+6\}$, as shown in Table 1.

TABLE 1

Number of DMRS Ports for Multi-Layer Transmission

| Number of Transmission Layers based on DMRS | DMRS Ports Used |
| --- | --- |
| 1 | 7 or 8 |
| 2 | 7, 8 |
| 3 | 7, 8, 9 |
| 4 | 7, 8, 9, 10 |
| 5 | 7, 8, 9, 10, 11 |
| 6 | 7, 8, 9, 10, 11, 12 |
| 7 | 7, 8, 9, 10, 11, 12, 13 |
| 8 | 7, 8, 9, 10, 11, 12, 13, 14 |

Consequently, if there are more than 2 layers (v>2), both CDM groups are used. CDM1 and CDM2 are mutually orthogonal in the frequency domain. However, all ports in the same CDM group share the same Resource Elements (REs) and are multiplexed using the time-direction orthogonal covering codes (OCCs) shown in Table 2. For extended CP, only one CDM group containing DMRS ports 7 and 8 is supported and correspondingly only two OCC sequences are needed: [+1 +1] and [+1 −1].

TABLE 2

DMRS CDM groups and OCC for normal CP

| Antenna port p | CDM1 | CDM2 | Orthogonal Covering Code (OCC) |
| --- | --- | --- | --- |
| 7 | x | | [+1 +1 +1 +1] |
| 8 | x | | [+1 −1 +1 −1] |

TABLE 2-continued

DMRS CDM groups and OCC for normal CP

| Antenna port p | CDM1 | CDM2 | Orthogonal Covering Code (OCC) |
|---|---|---|---|
| 9  |   | x | [+1 +1 +1 +1] |
| 10 |   | x | [+1 −1 +1 −1] |
| 11 | x |   | [+1 +1 −1 −1] |
| 12 |   | x | [−1 −1 +1 +1] |
| 13 | x |   | [+1 −1 −1 +1] |
| 14 |   | x | [−1 +1 +1 −1] |

In downlink SU-MIMO, independent DMRS antenna ports are used for all layers. In MU-MIMO, no more than two layers per UE with orthogonal DMRS antenna ports should be assumed and the number of co-scheduled UEs should not exceed four. However, only DMRS antenna ports 7 and 8 can be used in MU-MIMO and layers of co-scheduled UEs may occupy the same port. To separate those layers sharing the same DMRS port, LTE Rels. 9 and 10 define a new scrambling identity field, as shown in Table 3 for the most recent Downlink Control Indicator/Information (DCI) format 2B or 2C associated with the PDSCH transmission.

TABLE 3

Mapping of Scrambling Identity Field in DCI format 2B or 2C to $n_{SCID}$ values for Antenna Ports 7 and 8

| Scrambling Identity Field in DCI format 2B or 2C | $n_{SCID}$ |
|---|---|
| 0 | 0 |
| 1 | 1 |

$n_{SCID}$ is used for initialization of the pseudo-random sequence generator for DMRS, i.e.:

$$c_{init} = (\lfloor n_s/2 \rfloor + 1) \cdot (2 N_{ID}^{cell} + 1) \cdot 2^{16} + n_{SCID} \quad (1)$$

where:

$c_{init}$ is the initial pseudo-random sequence for DMRS (i.e., at the start of the subframe);

$n_s$ is the slot number within a radio frame; and $N_{ID}^{cell}$ is the physical layer cell identity.

Different $n_{SCID}$ values are used for two UEs occupying the same DMRS port, thereby enabling channel estimations for both of them using the same OCC but with non-orthogonal pseudo-random sequences. This non-orthogonality adds additional complexity for MU-MIMO channel estimations. If there is no DCI format 2B or 2C associated with the PDSCH transmission on antenna ports 7 or 8, the UE assumes that $n_{SCID}$ is zero. For antenna ports 9 to 14, the UE also assumes the $n_{SCID}$ value is zero.

Signal Model

In the signal model used to describe some embodiments of the present invention further below, the signal received at a specific receiver antenna at a specific DMRS RE, $(k_f, l_t) \in P$, after discarding CP and performing Fast Fourier Transform (FFT), can be written:

$$y(k_f, l_t) = \sum_{n=0}^{N} w_n(k_f, l_t) x_n(k_f, l_t) H_n(k_f, l_t) + z(k_f, l_t) \quad (2)$$

where:

$(k_f, l_t)$ is an RE index pair, having subcarrier $k_f$ and OFDM symbol $l_t$, and belonging to RE set P used for transmitting the DMRS (i.e., $k_f, l_t) \in P$);

N is the number of DMRS layers in a CDM group (hence $1 \le N \le 4$);

$y(k_f, l_t)$ is the received signal of RE $(k_f, l_t)$;

$H_n(k_f, l_t)$ is the composite channel of RE $(k_f, l_t)$ for layer n;

$x_n(k_f, l_t)$ is the unit-amplitude random scrambling sequence of RE $(k_f, l_t)$ for layer n;

$w_n(k_f, l_t)$ is the unit-amplitude OCC code at RE $(k_f, l_t)$ for layer n; and $z(k_f, l_t)$ is the received AWGN of RE $(k_f, l_t)$ with variance $\sigma^2$.

Since layers of different CDM groups are orthogonal in frequency, they can be estimated independently. Therefore, channel estimations for layers within only one CDM group need be considered. For purposes of explanation and description by example (without limitation to other embodiments of the present invention), only the case where all layers in the same CDM group share the same Scrambling Identity Field (SCID) with different OCC codes is considered. One of ordinary skill in the art could extrapolate different implementations according to other embodiments of the present invention based on the entirety of the specification herein.

As stated above, all that is required for channel estimation are the layers of a single CDM group, because the layers of different CDM groups are orthogonal in frequency. In the present signal model, the only CDM group being considered is CDM1 with OFDM symbols $l_0=5$, $l_1=6$, $l_2=12$, and $l_3=13$, on subcarriers $k_0=1$, $k_1=6$, and $k_3=11$, as shown in FIG. 1B Although it is possible to estimate channels directly, i.e., without descrambling and despreading, the computation complexity of implementing such a method of channel estimation is very high. For example, for the typical normal CP case as shown in FIG. 1B, there are 12 DMRS REs in the PRB and the sequence $x_n(k, l)$ may vary from PRB to PRB, resulting in 12×12 matrix inversion for each PRB if 2D MMSE estimation is used.

To reduce the complexity, the signal model used herein assumes explicit descrambling and despreading is applied to separate each layer within the same CDM group before performing any MMSE estimations. For despreading, the Spreading Factor (SF) can be 1, 2 or 4 depending on the number of total DMRS layers (or ports) being used for downlink transmissions, as seen in Table 4 below. For a given N, in order to separate different layers based on OCCs, possible SFs are given by:

$$SF \in [2^{\lceil \log_2 N \rceil}, \ldots, 2^2] \quad (3)$$

TABLE 4

SF Choices and DMRS Channel Estimation Algorithms

| Number of Layers in a CDM Group | Chosen SF for Spreading | Channel Estimation Candidates after Descrambling and Despreading |
|---|---|---|
| N = 1 | 2 | Full 2D-MMSE<br>2x1D-MMSE |
| N = 2 | 2 | Partial 2D + 2x1D-MMSE |
| N = 3, 4 | 4 | 1D-MMSE (frequency only) |

For N=1 and 2, although SF=4 can be used (assuming that the channel is invariant within one subframe), the performance will degrade for medium to high speeds. For N=3 or 4, SF=4 must be selected so that there are enough dimensions to separate those layers. Since for each subcarrier after despreading with SF=4, there is only one combined symbol per PRB, only frequency-direction 1D-MMSE is required (i.e., there is no time-direction), which is only a subproblem of the case N=1 or 2. Accordingly, this specification need not consider the specific case of N=3 or 4 and SF=4 separately, as one of ordinary skill in the art would understand. To seek a good tradeoff between complexity and performance (but without limitation on embodiments of the present invention), SF=2 and N=1, 2 are selected for this model.

As mentioned above, in this signal model, only CDM group CDM1 needs to be considered. Since it is assumed that all DMRS ports in a CDM group share the same random sequence, the layer subscript of the scrambling sequence can be dropped and the signal model (Equation (2)) can be rewritten:

$$y(k_f, l_t) = \sum_{n=0}^{N} w_n(k_f, l_t)x(k_f, l_t)H_n(k_f, l_t) + z(k_f, l_t) \quad (4)$$

At a specific DMRS subcarrier $k_f$, after descrambling and despreading with SF=2 and assuming the channel is invariant over two consecutive OFDM symbol periods, the result is, after despreading the first two (consecutive) OFDM symbols $l_0$=5 and $l_1$=6:

$$\tilde{H}_{n,dspr}(k_f, l_0) = \frac{1}{2}\sum_{t=0}^{1} y(k_f, l_t)w_n^*(k_f, l_t)x^*(k_f, l_t) \quad (5)(a)$$

$$\tilde{H}(k_f, l_0) = H(k_f, l_0) + \bar{z}(k_f, l_0) \quad (5)(b)$$

After despreading, the crossover term in Equation (5)(a) disappears from Equation (5)(b) because the two DMRS ports within the same CDM group have orthogonal OCCs. Thus, Equation (5)(b) is the raw channel estimate for each pilot location, where $H(k_f,l_0)$ is the actual channel value for pilot subcarrier $k_f$ at time $l_0$, and $\bar{z}(k_f,l_0)$ is the Additive White Gaussian Noise (AWGN) noise with power $$\frac{\sigma^2}{2}.$$

Here $\sigma^2$ is the original noise power before despreading because despreading reduces the post-despreading noise power by half. See U.S. Prov. App. 61/939,649, from which this application claims priority and of which the entirety has already been incorporated by reference, for more details.

As discussed above, because DMRS subcarrier $k_f$ is assumed invariant over two consecutive OFDM symbol periods, the two sets of consecutive pilot OFDM symbols $l_0$ at t=5 & $l_1$ at t=6 and $l_2$ at t=12 & $l_3$ at t=13 can be reduced to only two pilot OFDM symbols $l_0$ at t=5 and $l_2$ at t=12 on each pilot subcarrier $k_f$ in this signal model, which means the signal model need only consider six REs, i.e., six pilot locations.

Figure 2:
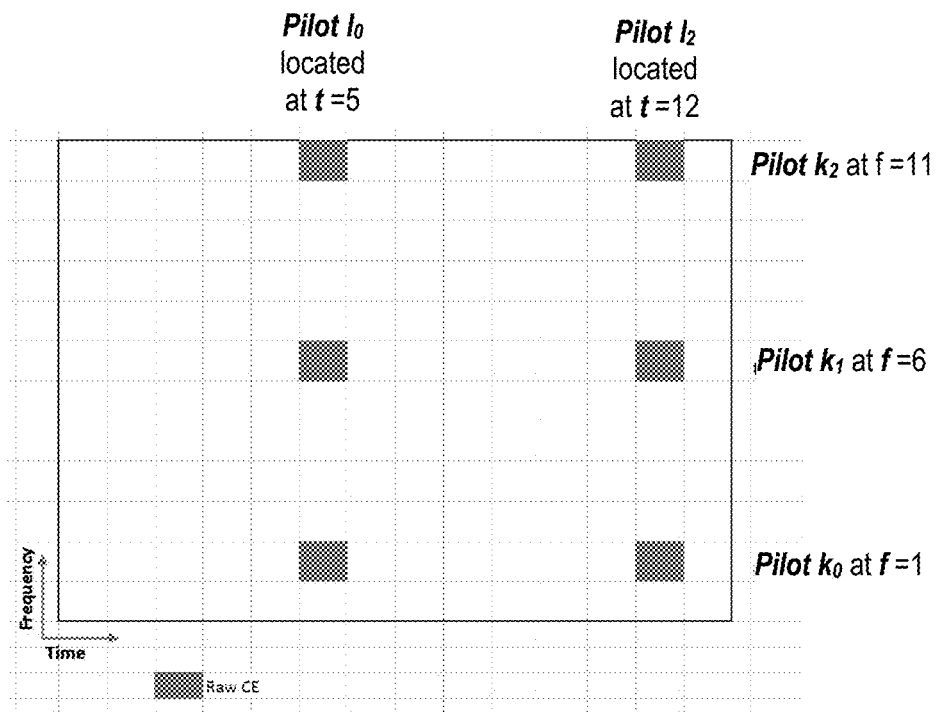
FIG. 2 shows the initial six raw channel estimates (CE) in the six pilot locations reduced from CDM1 in FIG. 1B, in a signal model in which there are only two antenna ports 7 and 8, according to an embodiment of the present invention.

FIG. 2 illustrates, after initial despreading, the initial six raw channel estimates (CE) at the six (6) pilot locations (the highlighted squares), namely: pilot RE($l_0$ at t=5, $k_0$ at f=1), pilot RE($l_0$ at t=5, $k_1$ at f=6), pilot RE($l_0$ at t=5,$k_3$ at f=11), pilot RE($l_2$ at t=12,$k_0$ at f=1), pilot RE($l_2$ at t=12, $k_1$ at f=6), and pilot RE($l_2$ at t=12, $k_3$ at f=11). Once again, the signal model assumes there are only two antenna ports, 7 and 8, which are separated, and their channel estimation can be done independently.

All six post-despreading raw channel estimates in FIG. 2 can be represented as:

$$\tilde{H}_{n,dspr}(k_f,l_t), f=0,1,2, t=0,2 \quad (6)(a)$$

which can be stacked into a single column vector as:

$$\tilde{H}_{dspr}=[\tilde{H}(k_0,l_0),\tilde{H}(k_1,l_0),\tilde{H}(k_2,l_0),\tilde{H}(k_0,l_2),\tilde{H}(k_1,l_2),\tilde{H}(k_2,l_2)]^T \quad (6)(b)$$

where $(k_f,l_t)$, f=0,1,2, t=0,1 denotes a pilot RE location, f=0,1,2, and t=0,1. For simplicity, the layer subscript has been dropped. Since there is no correlation between different antenna ports after despreading, the channel of each layer can be estimated independently. Thus, the noiseless post-despreading channel vector can be defined as:

$$H_{dspr}=[H(k_0,l_0),H(k_1,l_0),H(k_2,l_0),H(k_0,l_2),H(k_1,l_2),H(k_2,l_2)]^T \quad (6)(c)$$

Channel estimation recovers channel estimates at other REs from the vector $\tilde{H}_{dspr}$.

MMSE Channel Estimation

For purposes of succinct and brief description, embodiments of the present invention are described by reference to MMSE estimations. However, as would be understood by one of ordinary skill in the art, other estimation functions might be used. For MMSE channel estimations, the channel correlation function is assumed to be known and can be factorized as:

$$r(\Delta k,\Delta l)=E\{H(k+\Delta k,l+\Delta l)H^H(k,l)\} \quad (7)(a)$$

$$=\sigma_H^2 r_F(\Delta k)R_T(\Delta l) \quad (7)(b)$$

where $\sigma_H^2$ is the average channel power per subcarrier, $r_F(\Delta k)$ is the frequency correlation sequence, and $R_T(\Delta l)$ is the time correlation sequence. Both $r_F(\Delta k)$ and $R_T(\Delta l)$ have to be estimated or based on some heuristic models. Typically, the famous Jakes model can be assumed for time correlation. For frequency correlation, different models may be used, as discussed in more detail below.

Full 2D-MMSE Channel Estimation

Figure 3B:
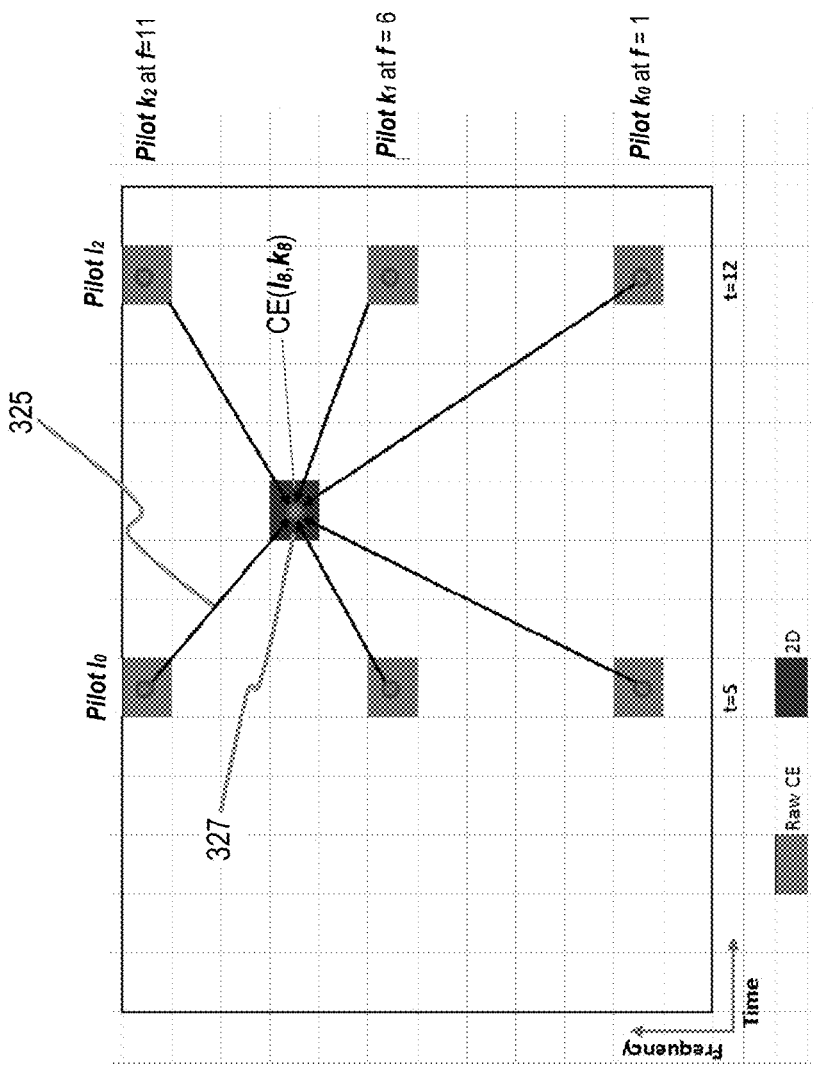
FIGS. 3A and 3B are a method flowchart and a diagram of an RB, respectively, illustrating full 2D-MMSE channel estimation using the six pilot locations in FIG. 2.
Figure 3A:
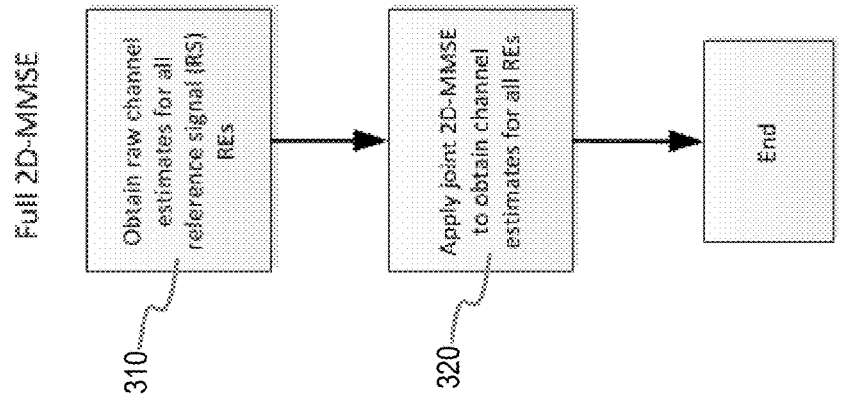

As shown in FIG. 3A, the first step 310 in 2D-MMSE is to obtain raw channel estimates for all reference signals REs. As explained above, in this signal model only six pilot location REs are used for step 310, whose raw channel estimates (CEs) are shown in FIG. 3B in the same locations as they were in FIG. 2. Then, in step 320, joint 2D-MMSE is applied in order to obtain channel estimates for all REs. In FIG. 3B, the channel estimate for a single RE, RE($l_t,k_f$) for t=8 and f=8, i.e., RE($l_8,k_8$), is shown. The application of joint 2D-MMSE is shown by the arrows from each of the raw CEs, such as arrow 325, in FIG. 3B. The final channel estimate CE($l_8,k_8$) 327 has both the estimated time correlation sequence and the estimated frequency correlation sequence for RE($l_8,k_8$).

More specifically, in full 2D-MMSE channel estimation, joint frequency and time MMSE filtering is applied for each RE (k,l):

$$\tilde{H}^{2D}(k,l)=A^{2D}(k,l)\tilde{H}_{dspr} \quad (8)$$

The 2D MMSE weight can be derived using the well-known orthogonality principle:

$$E\{(\tilde{H}^{2D}(k,l)-H(k,l))\tilde{H}_{dspr}^H\}=0 \quad (9)$$

from which the MMSE weight can be found as:

$$A^{2D}(k,l)=E\{H(k,l)\tilde{H}_{dspr}^H\}\{E\{\tilde{H}_{dspr}\tilde{H}_{dspr}^H\}\}^{-1} \quad (10)$$

From $r(\Delta k, \Delta l)$, the auto- and cross-correlations can be calculated as below:

$$E\{\tilde{H}_{dspr}\tilde{H}_{dspr}^H\} = E\{H_{dspr}H_{dspr}^H\} + \frac{\sigma^2}{2}I_6 \quad (11)$$

and $$E\{H(k,l)\tilde{H}_{dspr}^H\} = E\{H(k,l)H_{dspr}^H\} \quad (12)$$

Therefore, under full 2D-MMSE, channel estimates at other REs are recovered from the vector $\tilde{H}_{dspr}$ using:

$$\hat{H}^{2D}(k,l) = E\{H(k,l)H_{dspr}^H\}\left(E\{H_{dspr}H_{dspr}^H\} + \frac{\sigma^2}{2}I_6\right)^{-1}\tilde{H}_{dspr} \quad (13)$$

Although the full 2D-MMSE is the optimal MMSE estimator, its complexity is very high. The complexity mainly comes from:

A 6×6 auto-correlation matrix inversion; and

A 1×6 cross-correlation matrix computation for each RE.

Typically, there are a total of 14×12=168 REs. Excluding those REs reserved for CRS, DMRS and other control channels, there are still more than 100 cross-correlations to be calculated, incurring quite significant computational complexity.

2×1D-MMSE Channel Estimation

Figure 4B:
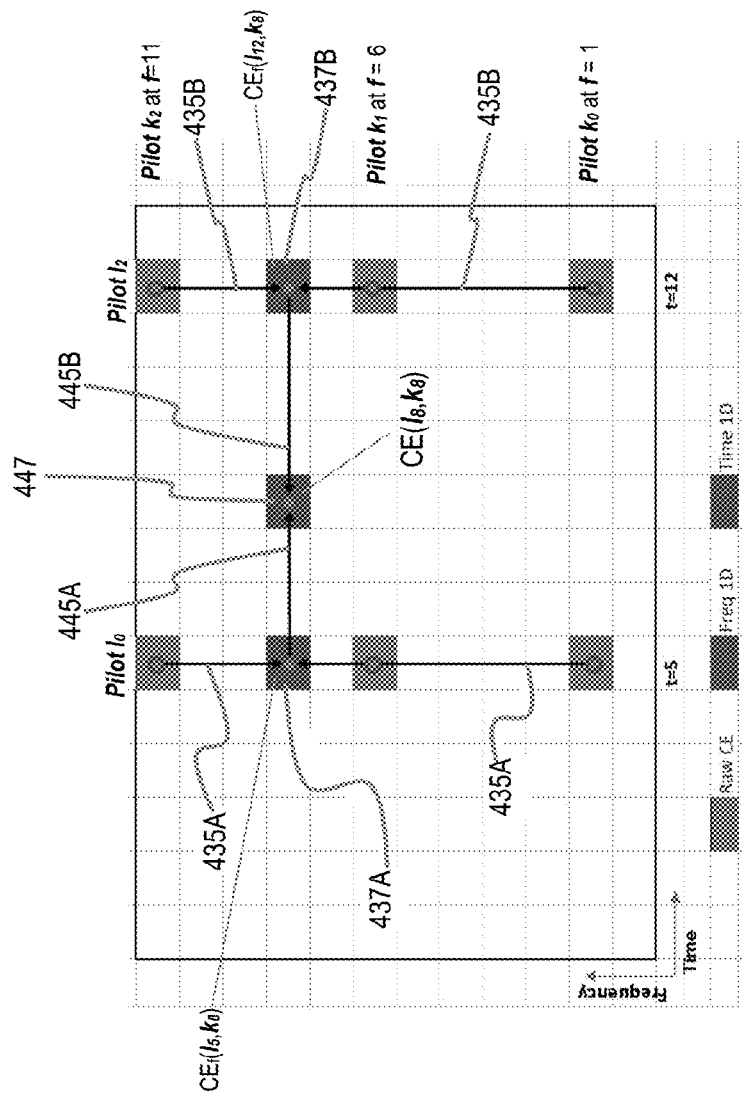
FIGS. 4A and 4B are a method flowchart and a diagram of an RB, respectively, illustrating 2×1D-MMSE channel estimation using the six pilot locations in FIG. 2.
Figure 4A:
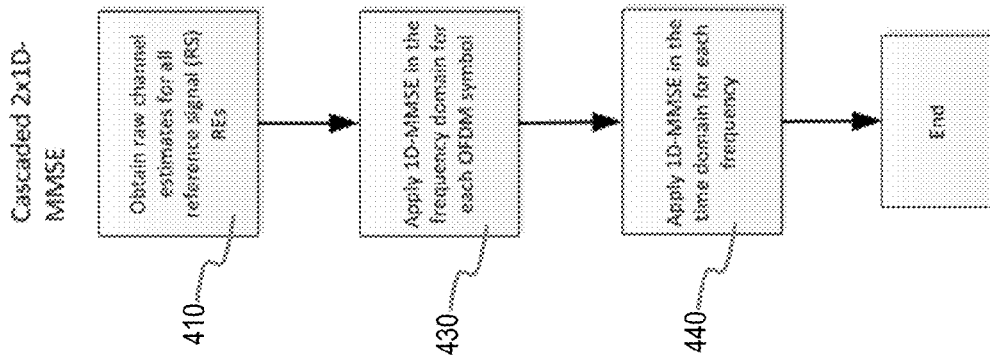

As shown in FIG. 4A and similarly to 2D-MMSE, the first step 410 in 2×1D-MMSE is to obtain raw channel estimates for all reference signals REs. As explained above, in this signal model only six pilot location REs are used for step 410, whose raw channel estimates (CEs) are shown in FIG. 4B in the same locations as they were in FIGS. 2 and 3B. After the raw channel estimates are obtained in step 410, frequency-direction 1D-MMSE is applied to those estimates in step 430. This is shown for the example of obtaining the final CE of RE($l_8, k_8$) in FIG. 4B. Frequency-direction 1D-MMSE is applied to the raw CEs at OFDM symbols $l_0$ at t=5 and $l_2$ at t=12, as shown by the frequency-direction set 435A of arrows on the left-hand side and set 435B of arrows on the right-hand side, respectively. This results in two frequency dimension solutions: $CE_f(l_t$ at t=5, $k_f$ at f=8) 437A and $CE_f(l_t$ at t=12, $k_f$ at f=8) 437B, as shown in FIG. 4B.

Then in step 440 of FIG. 4A, time-direction 1D-MMSE is applied for each subcarrier. This is shown in FIG. 4B by arrow 445A from the frequency domain solution $CE_f(l_5, k_8)$ 437A (found in step 430) and arrow 445B from frequency domain solution $CE_f(l_{12}, k_8)$ 437B (found in step 430). Both arrows 445A and 445B point, in the time domain, to the final channel estimate $CE(l_8, k_8)$, which has both the estimated time correlation sequence and the estimated frequency correlation sequence for RE($l_8, k_8$).

More specifically, step 410 starts with an observation vector consisting of three post-despreading DMRS raw channel estimates at each of $l_0$ at t=5 and $l_2$ at t=12:

$$\tilde{H}_{dspr}(l_t)=[\tilde{H}(k_0,l_t),\tilde{H}(k_1,l_t),\tilde{H}(k_2,l_t)]^T, t=0,2 \quad (14)(a)$$

The corresponding noiseless versions are $$H_{dspr}(l_t)=[H(k_0,l_t),H(k_1,l_t),H(k_2,l_t)]^T, t=0,2 \quad (14)(b)$$

(a) Frequency-Direction 1D-MMSE (Step 430)

At step 430, the frequency-direction 1D-MMSE is applied independently for each of symbol time $l_0$ and $l_2$. Each time, the frequency-direction 1D-MMSE estimate for subcarrier k and OFDM symbol $l_t$ is:

$$\tilde{H}^{freq1D}(k,l_t)=A^{freq1D}(k,l_t)\tilde{H}_{dspr}(l_t), t=0,2 \quad (15)$$

The frequency 1D-MMSE weight can be calculated also using the orthogonality principle which is $$A^{freq1D}(k,l_t)=E\{H(k,l_t)\tilde{H}_{dspr}^H(l_t)\}\{E\{\tilde{H}_{dspr}(l_t)\tilde{H}_{dspr}^H(l_t)\}\}^{-1}, t=0,2 \quad (16)$$

From $r(\Delta k, \Delta l)$, the auto- and cross-correlations can be calculated as below:

$$E(\tilde{H}_{dspr}(l_t), \tilde{H}_{dspr}(l_t)^H) = E(H_{dspr}(l_t)H_{dspr}^H(l_2)) + \frac{\sigma^2}{2}I_3, \quad (17)$$
$$t=0,2$$

and $$E\{H(k,l_t)\tilde{H}_{dspr}^H(l_t)\}=E\{H(k,l_t)H_{dspr}^H(l_t)\}, t=0,2 \quad (18)$$

After the frequency-direction 1D-MMSE in step 430, two channel estimation at symbol $l_0$ and $l_2$ are available for each subcarrier: $\hat{H}^{freq1D}(k,l_0)$ and $\hat{H}^{freq1D}(k,l_2)$, k=0, . . . , 11. In FIG. 4B, this is shown for the single subcarrier k=8 by the two channel estimates $CE_f(l_5, k_8)$ 437A and $CE_f(l_{12}, k_8)$ 437B. Next, time-direction 1D-MMSE is performed to find channel estimation $\hat{H}^{freq1D+time1D}(k,l), l=0, \ldots, 14$, for each symbol and given subcarrier k.

(b) Time-Direction 1D-MMSE (Step 440)

In step 440, time-direction 1D-MMSE is applied for each frequency. In U.S. Prov. App. 61/939,649, from which this application claims priority and of which the entirety has already been incorporated by reference, several time-direction 1D-MMSE methods are derived, discussed, and compared, including Optimal Time-Direction 1D-MMSE and Suboptimal Time-Direction 1D-MMSE with (or without) Noise Power Scaling. Embodiments of the present invention are not limited to those examples, and many variations and other methods could be generated using ordinary skill in the art, on the basis of the present disclosure.

The end result of step 440, after applying the time-direction 1D-MMSE, can be derived and simplified (with details omitted for simplicity) as:

$$\hat{H}^{freq1D+time1D}(k,l) = A^{times1D}(k,l)\begin{bmatrix}\hat{H}^{freq1D}(k,l_0)\\ \hat{H}^{freq1D}(k,l_2)\end{bmatrix} \quad (19)$$

To reduce the complexity, linear or high-order interpolation methods can be used for either time or frequency or both 1D estimators. 2×1D is simpler than 2D due to simple cross and auto-correlation matrices.

When the SNR is high and/or the frequency selectivity is high, 2×1D-MMSE will suffer noticeable performance loss compared with the full 2D-MMSE.

Hybrid 2D/2×1D-MMSE Channel Estimation

Figure 5A:
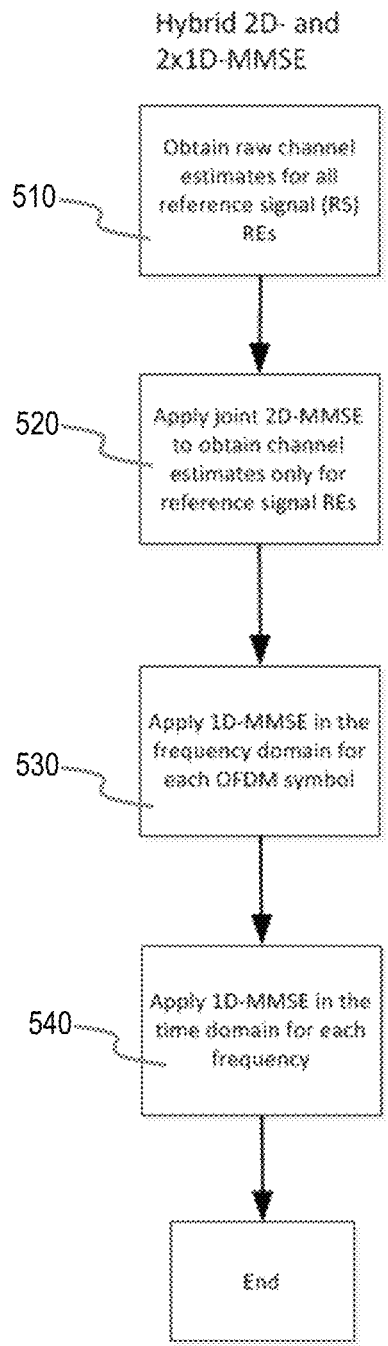
FIGS. 5A and 5B are a method flowchart and a diagram of an RB, respectively, illustrating a Hybrid 2D/2×1D-MMSE channel estimation using the six pilot locations in FIG. 2, according to an embodiment of the present invention.
Figure 5B:
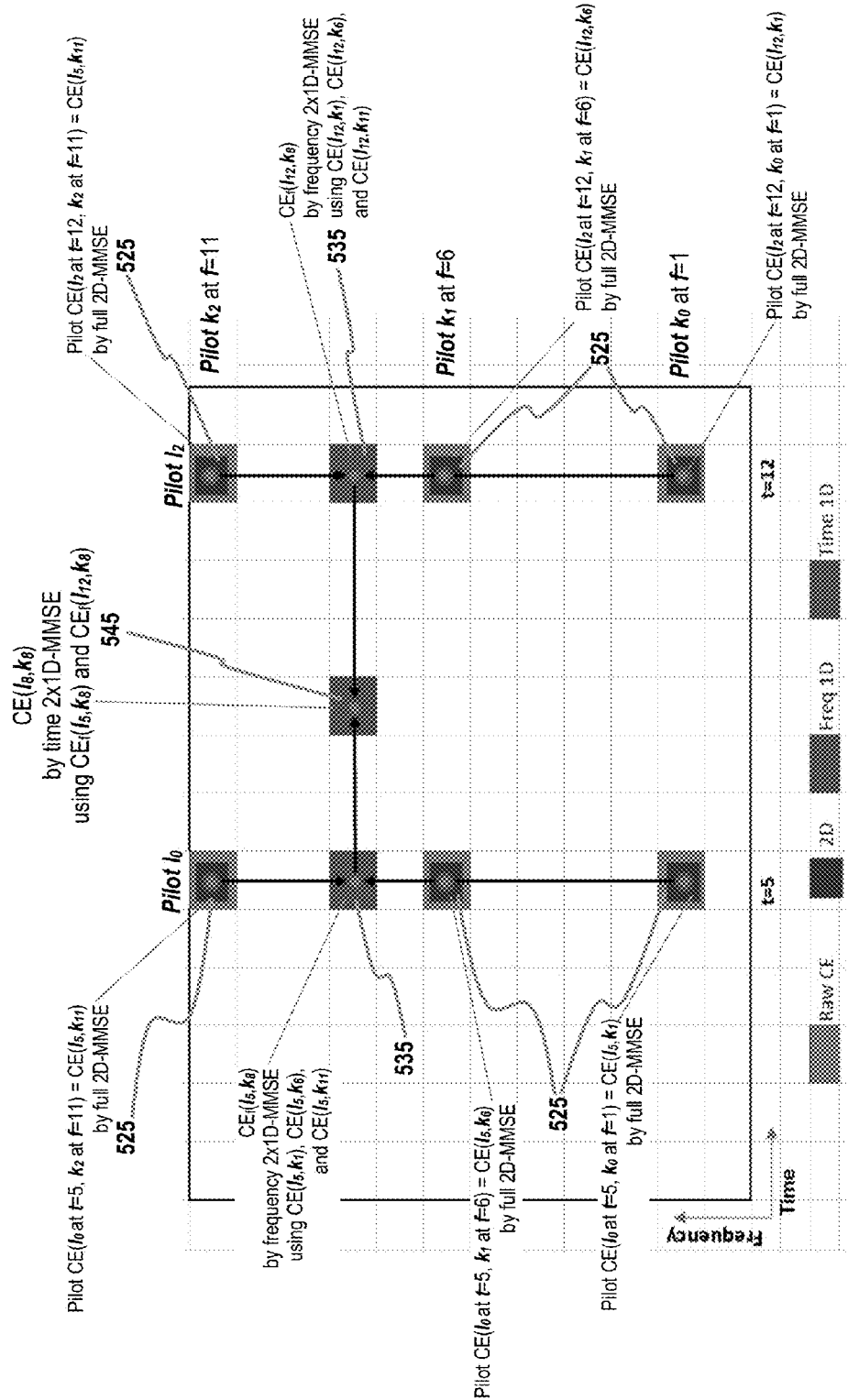

According to an embodiment of the present invention, the Hybrid 2D/2×1D partially combining both the full 2D-MMSE and the cascaded 2×1D-MMSE forms a two-stage method, as shown by the flowchart of a method in FIG. 5A and the diagram of a Resource Block (RB) in FIG. 5B.

Similarly to 2D-MMSE in FIGS. 3A/B and 2×1D-MMSE in FIGS. 4A/B, the first step 510 in Hybrid 2D/2×1D-MMSE is to obtain raw channel estimates for all reference signals REs, as shown in FIG. 5A. As explained above, in this signal model only six pilot location REs are used for step 510, with their respective raw channel estimates (CEs) shown in FIG. 5B in the same locations as they were in FIGS. 2, 3B, and 4B.

However, in step 520 of the Hybrid 2D/2×1D-MMSE, full 2D-MMSE is applied only to the REs having DMRS in step 520, i.e., the same six pilot location REs for which raw channel estimates were obtained in step 510. These channel estimate results are, as discussed above, far more accurate than 2×1D channel estimation. These channel estimates (CEs) are shown in FIG. 5B by the solid blocks 525 inside of each of the six pilot locations, each of which is also labeled by "Pilot CE" and their respective specific details.

In step 530 of the Hybrid 2D/2×1D-MMSE, frequency domain 1D-MMSE is applied to each OFDM symbol in the subframe, using the more accurate full 2D-MMSE results from step 520. This step is shown for the example of the OFDM symbol at RE($l_8,k_8$) in FIG. 5B by the frequency-domain arrows from the six final Pilot CEs to the two frequency dimension solutions, both labeled 535 and each also labeled by "CE$_f$" with their respective specific details, i.e., CE$_f$($l_5,k_8$) and CE$_f$($l_{12},k_8$). Because these frequency 1D-MMSE channel estimates 535 use the more accurate six final Pilot CEs calculated using full 2D-MMSE, the frequency 1D-MMSE channel estimates 535 are, in turn, more accurate than the frequency 1D-MMSE channel estimates 437A/B in FIG. 4B, which are calculated using only the raw CEs at the pilot locations.

In step 540 of the Hybrid 2D/2×1D-MMSE in FIG. 5A, time domain 1D-MMSE is applied for each subcarrier. This step is shown for the example of the OFDM symbol/subcarrier at RE($l_8,k_8$) in FIG. 5B by the time-domain arrows from the two frequency dimension solutions 535, i.e., CE$_f$($l_5,k_8$) and CE$_f$($l_{12},k_8$) derived in step 530, to the final channel estimate CE($l_8,k_8$) 545, which has both the estimated time correlation sequence and the estimated frequency correlation sequence for RE($l_8,k_8$).

These steps will be described in greater detail below.

(a) 1$^{st}$ Stage: 2D-MMSE Applied to DMRS (Step 520)

In the first stage, step 520, the optimal joint time and frequency MMSE channel estimations (2D-MMSE) are applied only to the DMRS REs, as shown below:

$$\hat{H}^{2D}(k_f, l_t) = A^{2D}(k_f, l_t)\tilde{H}_{dspr} \quad (20)(a)$$

$$= E\{H(k_f, l_t)H^H_{dspr}\} \quad (20)(b)$$

$$\left(E\{H_{dspr}H^H_{dspr}\} + \frac{\sigma^2}{2}I_6\right)^{-1}\tilde{H}_{dspr}.$$

where $f = 0, 1, 2, t = 0, 2$

In comparison to full 2D-MMSE, which requires more than a hundred cross-correlation calculations, this limited application of 2D-MMSE only requires a few (typically six) cross-correlation calculations for each PRB. As mentioned above, the results of step 520 are indicated in FIG. 5B by the solid blocks 525 inside of each of the six pilot locations, each of which is also labeled by "Pilot CE" and their respective specific details.

(b) 2$^{nd}$ Stage: 1D-MMSE Applied to Remaining REs (Steps 530 & 540)

In the second stage, two cascaded frequency-direction and time-direction 1D-MMSE estimations (2×1D-MMSE) are used for the remaining non-DMRS REs. However, because of information provided from the first stage, the 2×1D-MMSE starts with better estimates than simple raw ones (as is usually the case in 2×1D-MMSE), which is expected to lead to improved performance.

First, in step 530, frequency-direction 1D-MMSE is applied, which is given by $$\hat{H}^{freq1D}(k, l_t) = A^{freq1D}(k, l_t)\begin{bmatrix}\hat{H}^{2D}(k_0, l_t)\\ \hat{H}^{2D}(k_1, l_t)\\ \hat{H}^{2D}(k_2, l_t)\end{bmatrix} \quad (21)(a)$$

$$= A^{freq1D}(k, l_t)\begin{bmatrix}A^{2D}(k_0, l_t)\\ A^{2D}(k_1, l_t)\\ A^{2D}(k_2, l_t)\end{bmatrix}\tilde{H}_{dspr}, t = 0.2 \quad (21)(b)$$

The frequency auto-correlation is calculated below:

$$E\left\{\begin{bmatrix}\hat{H}^{2D}(k_0, l_t)\\ \hat{H}^{2D}(k_1, l_t)\\ \hat{H}^{2D}(k_2, l_t)\end{bmatrix}\begin{bmatrix}\hat{H}^{2D}(k_0, l_t)\\ \hat{H}^{2D}(k_1, l_t)\\ \hat{H}^{2D}(k_2, l_t)\end{bmatrix}^H\right\} = \begin{bmatrix}A^{2D}(k_0, l_t)\\ A^{2D}(k_1, l_t)\\ A^{2D}(k_2, l_t)\end{bmatrix} \quad (22)(a)$$

$$E\{\tilde{H}_{dspr}\tilde{H}^H_{dspr}\}\begin{bmatrix}A^{2D}(k_0, l_t)\\ A^{2D}(k_1, l_t)\\ A^{2D}(k_2, l_t)\end{bmatrix}^H$$

$$= \begin{bmatrix}A^{2D}(k_0, l_t)\\ A^{2D}(k_1, l_t)\\ A^{2D}(k_2, l_t)\end{bmatrix}^H\left(E\{H_{dspr}H^H_{dspr}\} + \frac{\sigma^2}{2}I_6\right)\begin{bmatrix}A^{2D}(k_0, l_t)\\ A^{2D}(k_1, l_t)\\ A^{2D}(k_2, l_t)\end{bmatrix}^H \quad (22)(b)$$

Similarly, the frequency cross-correlation is:

$$E\left\{H(k, l_t)\begin{bmatrix}\hat{H}^{2D}(k_0, l_t)\\ \hat{H}^{2D}(k_1, l_t)\\ \hat{H}^{2D}(k_2, l_t)\end{bmatrix}^H\right\} = E\left\{H(k, l_t)\tilde{H}^H_{dspr}\begin{bmatrix}A^{2D}(k_0, l_t)\\ A^{2D}(k_1, l_t)\\ A^{2D}(k_2, l_t)\end{bmatrix}^H\right\} \quad (23)(a)$$

$$= E\{H(k, l_t)H^H_{dspr}\}\begin{bmatrix}A^{2D}(k_0, l_t)\\ A^{2D}(k_1, l_t)\\ A^{2D}(k_2, l_t)\end{bmatrix}^H, \quad (23)(b)$$

$t = 0.2$

In FIG. 5B, step 530 is shown for the example of the OFDM symbol at RE($l_8,k_8$) by the frequency-domain arrows from the six final Pilot CEs to the two frequency dimension solutions, CE$_f$($l_5,k_8$) and CE$_f$($l_{12},k_8$), both labeled 535.

After frequency-direction 1D-MMSE in step 530 as shown above, time-direction 1D-MMSE is applied in step 540. The optimal MMSE weights for the time-direction should be RE-dependent as in the 2×1D-MMSE case. To reduce the complexity, weights derived for subcarrier $k_1$ can be used for all subcarriers (i.e., simplified 2×1D-MMSE method two in U.S. Prov. App. 61/939,649). Thus:

$$\hat{H}^{time1D}(k_1, l) = A^{time1D}(k_1, l) \begin{bmatrix} \hat{H}^{2D}(k_1, l_0) \\ \hat{H}^{2D}(k_1, l_2) \end{bmatrix} \quad (24)(a)$$

$$= A^{time1D}(k_1, l) \begin{bmatrix} A^{2D}(k_1, l_0) \\ A^{2D}(k_1, l_2) \end{bmatrix} \tilde{H}_{dspr} \quad (24)(b)$$

The time auto-correlation is calculated below:

$$E\left\{ \begin{bmatrix} \hat{H}^{2D}(k_1, l_0) \\ \hat{H}^{2D}(k_1, l_2) \end{bmatrix} \begin{bmatrix} \hat{H}^{2D}(k_1, l_0) \\ \hat{H}^{2D}(k_1, l_2) \end{bmatrix}^H \right\} = \quad (25)$$

$$\begin{bmatrix} A^{2D}(k_1, l_0) \\ A^{2D}(k_1, l_2) \end{bmatrix} \left( E\{H_{dspr} H_{dspr}^H\} + \frac{\sigma^2}{2} I_6 \right) \begin{bmatrix} A^{2D}(k_1, l_0) \\ A^{2D}(k_1, l_2) \end{bmatrix}^H$$

Similarly, the time cross-correlation is:

$$E\left\{ H(k_1, l) \begin{bmatrix} \hat{H}^{2D}(k_1, l_0) \\ \hat{H}^{2D}(k_1, l_2) \end{bmatrix}^H \right\} = E\left\{ H(k_1, l_s) H_{dspr}^H \begin{bmatrix} A^{2D}(k_1, l_0) \\ A^{2D}(k_1, l_2) \end{bmatrix}^H \right\} \quad (26)(a)$$

$$= E\{ H(k_1, l) H_{dspr}^H \} \begin{bmatrix} A^{2D}(k_1, l_0) \\ A^{2D}(k_1, l_2) \end{bmatrix}^H \quad (26)(b)$$

In FIG. 5B, step 540 is shown for the example of the OFDM symbol/subcarrier at $RE(l_8,k_8)$ in by the time-domain arrows from the two frequency dimension solutions 535, i.e., $CE_f(l_5,k_8)$ and $CE_f(l_{12},k_8)$ derived in step 530, to the final channel estimate $CE(l_8,k_8)$ 545, which has both the estimated time correlation sequence and the estimated frequency correlation sequence for $RE(l_8,k_8)$.

Since the hybrid method significantly reduces the complexity of 2D and only adds some modest complexity to 2×1D, it provides a reasonable tradeoff between performance and computational complexity. Simulations were performed to analyze expected performance, as discussed in detail in U.S. Prov. App. 61/939,649. In general, the simulations suggest that implementations of Hybrid 2D/2×1D-MMSE might have no loss at all compared with full 2D-MMSE, but at a much lower complexity. The simulations also indicated that the optimal 2×1D cannot achieve the performance of full 2D-MMSE, even with a low frequency-selectivity channel. The approximate SNR degradation difference between 2×1D and Hybrid 2D/2×1D ranged from around 0.3 dB to around 0.5 dB.

Robust PDP

The simulations discussed and described in detail in U.S. Prov. App. 61/939,649 were also directed to assessing the effect of PDP mismatch, i.e., the problems caused by the difference between the assumed PDP model used in the MMSE estimation (e.g., the uniform PDP assumed in the calculations above) and the actual, current PDP of the channel. The simulations suggested that PDP mismatch can cause significant performance loss, especially when the actual channel has high SNR and high frequency-selectivity. For example, a 5 dB mismatch between the assumed uniform PDP and the actual PDP of a 30 Hz high frequency-selective channel with a maximum delay spread of 77 can result in about a 5 dB SNR loss, although that loss reduces to around 2-3 dB if the PDP mismatch is −5 dB. The simulations suggested a 2-3 dB loss even with a low delay spread channel. The simulations also suggested that the hybrid two-stage 2D/2×1D-MMSE according to an embodiment of the present invention would have better overall performance using a more robust PDP model. See U.S. Prov. App. 61/939,649 for more details.

According to an embodiment of the present invention, a more robust PDP model is determined using minimax optimization.

Figure 6:
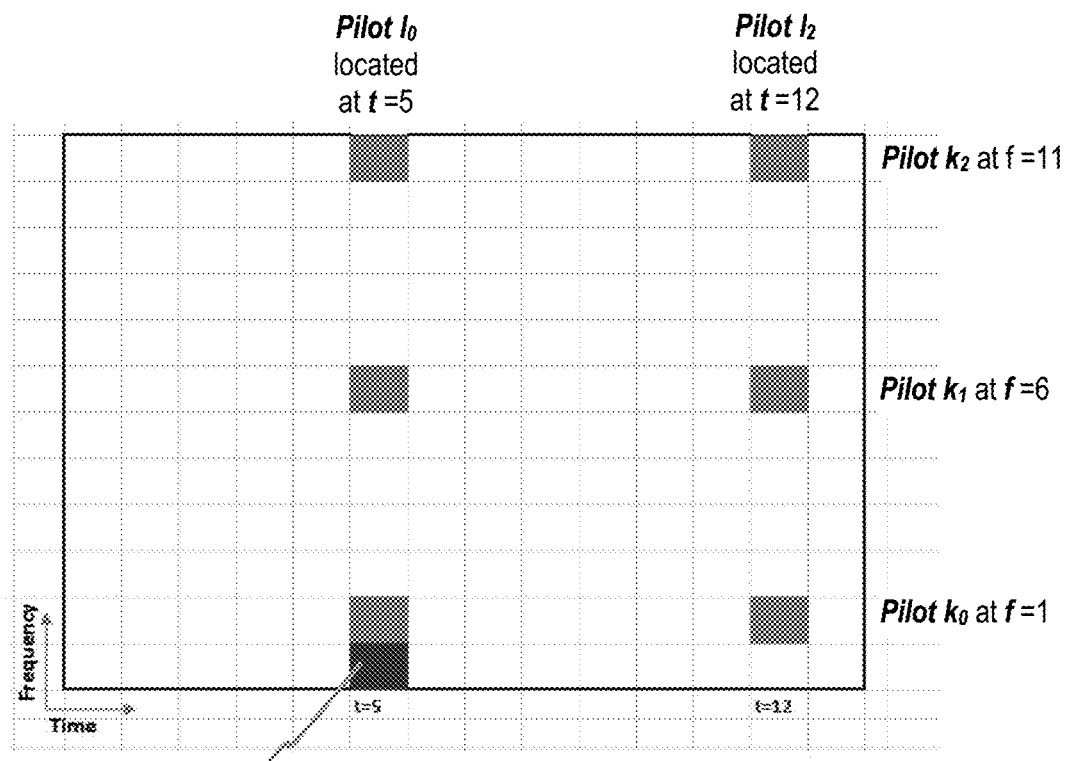
FIG. 6 is a diagram of an RB illustrating an example of a starting condition (in this case, a selected RE) for generating a more robust PDP using a minimax optimization formulation, according to an embodiment of the present invention.

The approach is illustrated by the 2×1D example shown in FIG. 6. Only the frequency domain 1D-MMSE is considered in this example, because the time domain 1D-MMSE does not use the PDP model. The approach minimizes the worst-case scenario for a selected RE. In the example illustrated in FIG. 6, edge RE 601 is the selected RE, and the goal is to minimize the worst-case Mean-Square Error (MSE) for it. In other embodiments, an average MSE among all of the REs or a subset of them in the frequency direction can be used, but both formulation and final result are similar.

*Robust 2-D channel estimation for multi-carrier systems with finite dimensional pilot grid*, by M. D. Nisar et al., ICASSP 2009, which is incorporated by reference in its entirety, provides a way to formulate the channel estimation problem as a minimax optimization problem. In the approach according to an embodiment of the present invention, a different formulation is used, which can generate both a robust PDP model and frequency correlation values, as explained below.

For a channel with L+1 paths, the PDP can be defined as $P(l) \geq 0, l=0, \ldots, L$, where $P(l)$ is the average power at path delay $l$ and $L$ is the maximum delay. The frequency correlation can be expressed as:

$$r_f(k) = \sum_{l=0}^{L} P(l) e^{-\frac{j2\pi kl}{N_{fft}}} \quad (27)$$

where $N_{fft}$ is the FFT size. This $r_f$ above is the true frequency correlation, while the $\bar{r}_f$ below is the frequency correlation actually used for calculating the MMSE weights. The worst-case MSE can be expressed as:

$$MSE(r_f, \bar{r}_f) \quad (28)$$

$r_f$: true frequency channel correlations,
$\bar{r}_f$: frequency channel correlations used for deriving MMSE weights Accordingly, the minimax optimization problem is to find the best $\bar{r}_f$ which minimizes the $MSE(r_f, \bar{r}_f)$, which can be formulated as:

$$(\bar{r}_f^*, r_f^*) = \underset{\bar{r}_f}{\operatorname{argmin}}\underset{r_f}{\operatorname{max}} MSE(r_f, \bar{r}_f) \quad (29)(a)$$

A saddle point exists, and the order of min and max operations can be switched to simplify the problem, subject to some constraints understood by those of ordinary skill in the art:

$$(\bar{r}_f^*, r_f^*) = \underset{r_f}{\operatorname{argmax}}\underset{\bar{r}_f}{\operatorname{min}} MSE(r_f, \bar{r}_f) \quad (29)(b)$$

$$= \underset{r_f}{\operatorname{argmax}} MSE(r_f, r_f) \quad (29)(c)$$

$$= \underset{r_f}{\operatorname{argmax}} r_f(0) - c_p(R_p + \sigma^2 I)^{-1} c_p^H \quad (29)(d)$$

where: $c_p$=frequency correlation vector for pilot REs, see Eq. (32) below;
$c_p^H$=Hermitian transpose of $c_p$;
$R_p$=channel correlation matrix for the pilot REs, see Eq. (33) below; and
$\sigma^2 I$=covariance matrix for AWGN.

Based on Equation (29)(d), the optimization problem can be stated and resolved as follows:

$$\min t \text{ subject to } \begin{bmatrix} t & c_p \\ c_p^H & R_p + \sigma^2 I \end{bmatrix} \succ 0 \quad (30)$$

$$r_f(0) = 1 \quad (31)$$

$$c_p = [r_f(-1), r_f(-6), r_f(-11)] \quad (32)$$

$$R_p = \begin{bmatrix} r_f(0) & r_f(-5) & r_f(-10) \\ r_f(5) & r_f(0) & r_f(-5) \\ r_f(10) & r_f(5) & r_f(0) \end{bmatrix} \quad (33)$$

$$R = \begin{bmatrix} r_f(0) & \ldots & r_f(-11) \\ \ldots & r_f(0) & \ldots \\ r_f(11) & \ldots & r_f(0) \end{bmatrix} \succ 0 \quad (34)$$

$$r_f(k) = \sum_{l=0}^{L} P(l) e^{-\frac{j2\pi k l}{N_{\mathit{fft}}}}, \text{ where } k = 0, \ldots, 11 \quad (35)$$

$$P(l) \geq 0, \sum_{l=0}^{L} P(l) = 1 \quad (36)$$

U.S. Prov. App. 61/939,649 provides examples of solving this problem. Specifically, convex optimization software CVX (http://cvxr.com/cvx/) was used to generate examples of optimal PDP $P(l) \geq 0, l=0, \ldots, L$ ($L=\tau_{max}$), which suggested that the optimal robust PDP will have a sparse distribution, i.e., only a few paths will have non-zero power. This would be beneficial in embodiments of the present invention where the optimal PDP or frequency correlation values are calculated and then stored in one or more look-up tables (LUTs) indexed by various values for SNR and/or maximum delay spread. The sparse distribution of the optimal robust PDP values would reduce the amount of storage needed for the LUT since only the active paths and their power need to be saved.

Figure 7:
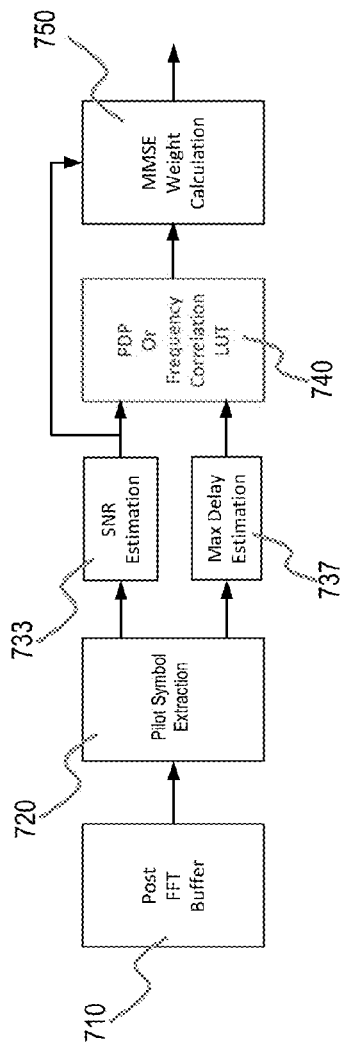
FIG. 7 is a block diagram of an implementation using a LUT to provide robust PDP, according to an embodiment of the present invention.

FIG. 7 is a block diagram of a LUT implementation, i.e., where the PDP and/or frequency correlation values are pre-calculated and pre-stored in a LUT in a device which performs MMSE weight calculations, according to an embodiment of the present invention.

The Post FFT Buffer 710 has the received communication after descrambling and the initial despreading, which is input to the Pilot Symbol Extraction module 720, which extracts the pilot symbols. Using the extracted pilot symbols, SNR Estimation module 733 estimates the SNR of the channel and Max Delay Estimation module 737 estimates the maximum delay spread of the channel. The estimated SNR and maximum delay spread are input to the PDP/Frequency Correlation LUT 740 to be used as indices to find the corresponding PDP/Frequency Correlation in the LUT 740. Once found, the corresponding PDP/Frequency Correlation are input to the MMSE Weight Calculation module 750, which uses the indicated PDP model (or frequency correlations thereof) and the estimated SNR from SNR Estimation module 733 to calculate the MMSE weights required for any type of MMSE approach (including 2D, 2×1D, and 2D/2×1D).

As mentioned above, in this embodiment, the PDP/Frequency Correlations are calculated beforehand, using the method discussed above, and then stored in LUT 740 so that the device may quickly look up the appropriate PDP/Frequency Correlation values without having to calculate them. Of course, the present invention is not limited to such an embodiment, and the device could, for example, make the calculations itself or be provided the appropriately-calculated PDP/Frequency Correlation values from another source, such as the communication network itself (from servers having local estimated SNR and maximum delay spread).

Figure 8:
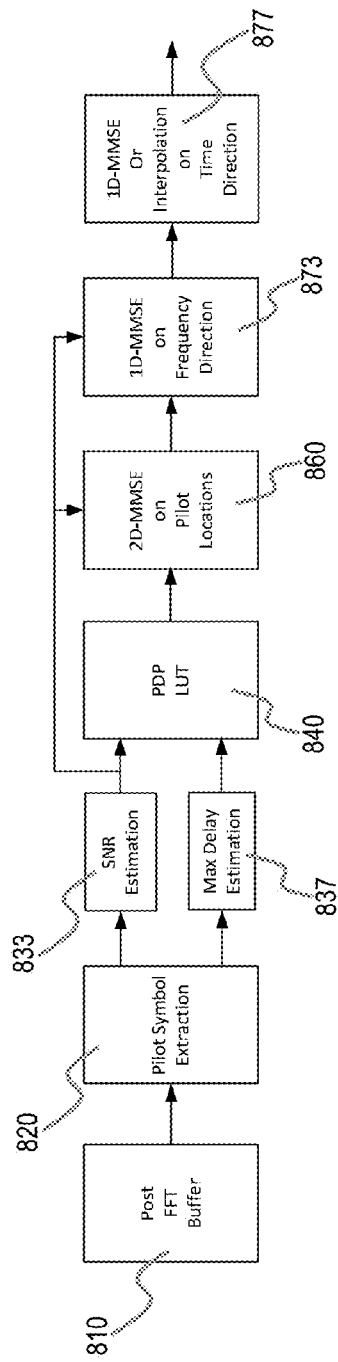
FIG. 8 is a block diagram of an implementation combining the two-stage Hybrid 2D/2×1D channel estimation with the LUT implementation of robust PDP, according to an embodiment of the present invention.

FIG. 8 is a block diagram of an implementation combining the two-stage Hybrid 2D/2×1D channel estimation with the LUT implementation of robust PDP, according to an embodiment of the present invention. Post FFT Buffer 810, SNR Estimation module 833, Max Delay Estimation module 837, and PDP/Frequency Correlation LUT 840 perform similar operations as their similarly-numbered corresponding components in FIG. 7.

However, in FIG. 8, the corresponding PDP/Frequency Correlation found in PDP LUT 840 are input to the 2D-MMSE module 860, which uses the indicated PDP model (or frequency correlations thereof) and the estimated SNR from SNR Estimation module 833 to make the 2D-MMSE calculations on the pilot symbol locations alone (1$^{st}$ stage). The cascaded 2$^{nd}$ stage of the two-stage Hybrid 2D/2×1D channel estimation consists of Frequency-direction 1D-MMSE module 873 and Time-direction 1D-MMSE module 877, which operate in accordance with the description above.

Depending on the embodiment of the present invention, some or all of the steps and/or operations may be implemented or otherwise performed, at least in part, on a portable or mobile device. "Portable device" or "mobile device" as used herein refers to any portable or movable electronic device having the capability of receiving wireless signals, including, but not limited to, multimedia players, communication devices, computing devices, navigating devices, etc. Thus, mobile devices include (but are not limited to) laptops, tablet computers, Portable Digital Assistants (PDAs), mp3 players, handheld PCs, Instant Messaging Devices (IMD), cellular telephones, Head-Mounted Displays (HMDs), Global Navigational Satellite System (GNSS) receivers, watches, or any such device which can be worn and/or carried on one's person.

Depending on the embodiment of the present invention, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present invention may include, without limitation, application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While several embodiments of the present invention have been shown and described herein, it will be understood by those of ordinary skill in the art that various changes in form and details may be made therein without departing from the spirit and scope of the present invention—i.e., the invention is not limited to any embodiments described herein, but is defined by the appended claims and their equivalents.

What is claimed is:

1. A method for a receiver to estimate one or more conditions of a channel upon which the receiver receives Orthogonal Frequency Division Multiplexing (OFDM) signals, comprising:
    performing joint two-dimensional Minimum Mean-Square Error (2D-MMSE) channel estimation on any Resource Element (RE) containing a reference signal in a received resource block (RB);
    using data at least from the joint 2D-MMSE channel estimation of the reference signal REs, performing one-dimensional Minimum Mean-Square Error (1D-MMSE) channel estimation in the frequency domain on each OFDM symbol in the received RB; and
    using data at least from the 1D-MMSE channel estimation in the frequency direction, performing channel estimation in the time domain on each frequency sub-carrier in the received RB.

2. The method of claim 1, wherein the reference signal is a User Equipment (UE)-specific reference signal.

3. The method of claim 2, wherein the UE-specific reference signal is a Demodulation Reference Signal (DMRS) in a Long Term Evolution (LTE) system.

4. The method of claim 1, wherein the receiver is in a system using multiple transmit-and-receive antennas for spatial diversity.

5. The method of claim 1, wherein the receiver is in a Multiple Input Multiple Output (MIMO) system.

6. The method of claim 5, wherein the receiver is in at least one of a single user (SU) or multiple user (MU) MIMO system.

7. The method of claim 1, wherein performing channel estimation in the time domain comprises:
    performing 1D-MMSE channel estimation in the time domain on each frequency subcarrier in the received RB.

8. The method of claim 1, wherein performing channel estimation in the time domain comprises:
    performing channel estimation by interpolation in the time domain on each frequency subcarrier in the received RB.

9. The method of claim 1, further comprising:
    extracting pilot signals from any RE containing a reference signal in a received RB.

10. The method of claim 1, further comprising:
    obtaining raw channel estimates for any RE containing a reference signal.

11. A method for a receiver to perform two-dimensional Minimum Mean-Square Error (2D-MMSE) channel estimation of a channel upon which the receiver receives Orthogonal Frequency Division Multiplexing (OFDM) signals, comprising:
    extracting pilot symbols from a descrambled and despread communication received over the channel;
    estimating a Signal-to-Noise Ratio (SNR) of the channel using the extracted pilot symbols from the descrambled and despread communication;
    estimating a maximum delay spread of the channel using the extracted pilot symbols from the descrambled and despread communication;
    using the estimated SNR and the estimated maximum delay spread as indices, finding at least one of a Power Delay Profile (PDP) or frequency correlations which correspond to the estimated SNR and maximum delay spread in a Look-Up Table (LUT); and
    calculating MMSE weights using the found at least one of a Power Delay Profile (PDP) or frequency correlations,
    wherein the at least one of a Power Delay Profile (PDP) or frequency correlations was calculated using minimax optimization and then stored in the LUT indexed by estimated SNR and the estimated maximum delay spread.

12. The method of claim 11, wherein the minimax optimization is based on minimizing the worst-case Mean Square Error (MSE) for one or more Resource Elements (REs) in a Resource Block (RB).

13. The method of claim 12, wherein the worst-case MSE is for one of a selected RE, an average of all the REs in the RB, or an average of a subset of the REs in the RB.

14. The method of claim 12, wherein, for a channel with L+1 paths, the PDP can be defined as $P(l) \geq 0, l = 0, \ldots, L$ where P(l) is the average power at path delay l, L is the maximum delay, and $N_{fft}$ is the Fast Fourier Transform (FFT) size, the frequency correlation can be expressed as:

$$r_f(k) = \sum_{l=0}^{L} P(l) e^{-\frac{j2\pi kl}{N_{fft}}}$$

and the minimax optimization problem can be expressed by the following equation:

$$MSE(r_f, \bar{r}_f) = \underset{\bar{r}_f}{\mathrm{argmax}} r_f(0) - c_p(R_p + \sigma^2 I)^{-1} c_p^H$$

where: $MSE(r_f, \bar{r}_f)$=worst case Mean-Square Error (MSE);
$r_f$: true frequency channel correlations;
$\bar{r}_f$: frequency channel correlations used for deriving MMSE weights;
$c_p$=frequency correlation vector for pilot REs;
$R_p$=channel correlation matrix for the pilot REs in a RB; and
$\sigma^2 I$=covariance matrix for Additive White Gaussian Noise.

15. The method of claim 14, wherein the minimax optimization problem is rewritten to be represented by the following equation:

$$\min t \text{ subject to } \begin{bmatrix} t & c_p \\ c_p^H & R_p + \sigma^2 I \end{bmatrix} \succ 0.$$

16. A portable device, comprising:
one or more antennas;
a receiver;
one or more processors; and
at least one non-transitory computer-readable medium having instructions that, when executed by the one or more processors, enable the portable device to perform the following steps:
performing joint two-dimensional Minimum Mean-Square Error (2D-MMSE) channel estimation on any Resource Element (REs) containing a reference signal in a resource block (RB) received, via the one or more antennas, by the transceiver;
using data at least from the joint 2D-MMSE channel estimation of the reference signal REs, performing one-dimensional Minimum Mean-Square Error (1D-MMSE) channel estimation in the frequency domain on each OFDM symbol in the received RB; and
using data at least from the 1D-MMSE channel estimation in the frequency direction, performing channel estimation in the time domain on each frequency sub-carrier in the received RB.

17. The portable device of claim 16, wherein the reference signal is a User Equipment (UE)-specific Demodulation Reference Signal (DMRS) in a Long Term Evolution (LTE) system.

18. The portable device of claim 16, wherein the receiver is capable of receiving signals in a Multiple Input Multiple Output (MIMO) system.

19. The portable device of claim 16, wherein performing channel estimation in the time domain comprises:
performing 1D-MMSE channel estimation in the time domain on each frequency subcarrier in the received RB.

20. The portable device of claim 16, further comprising:
a Look-Up Table (LUT),
wherein at least one of the at least one non-transitory computer-readable medium has instructions that, when executed by the one or more processors, enable the portable device to perform the following steps:
extracting pilot symbols from a received communication;
estimating a Signal-to-Noise Ratio (SNR) of the channel using the extracted pilot symbols;
estimating a maximum delay spread of the channel using the extracted pilot symbols;
using the estimated SNR and the estimated maximum delay spread as indices, finding at least one of a Power Delay Profile (PDP) or frequency correlations which correspond to the estimated SNR and maximum delay spread in the Look-Up Table (LUT); and
using the found at least one of a Power Delay Profile (PDP) or frequency correlations in performing at least one of the steps of performing joint 2D-MMSE and performing 1D-MMSE in the frequency domain.

* * * * *